G. W. McGILL.
COMBINED ERASIVE TIP AND PENCIL POINT PROTECTOR.
No. 188,653. Patented March 20, 1877.
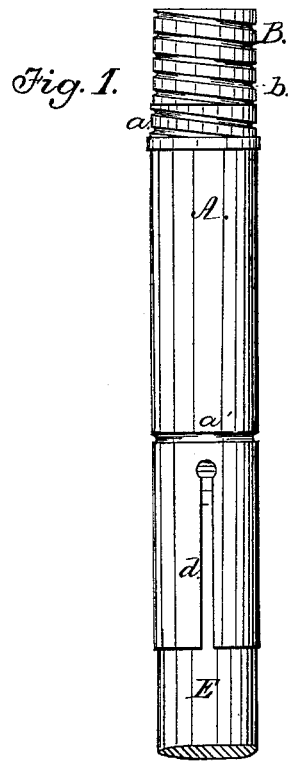
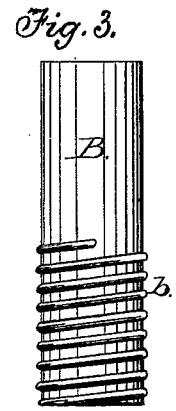
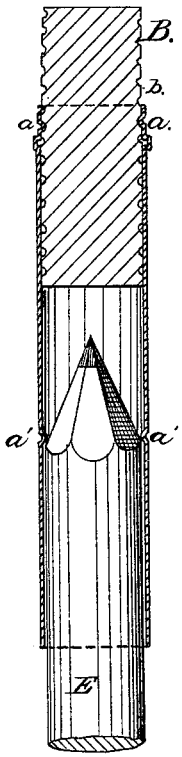
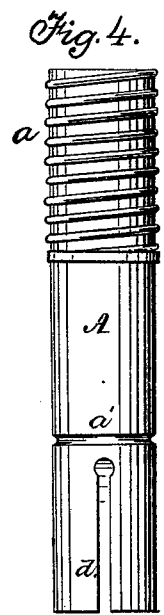
Witnesses:
Inventor:
George W. McGill
By Parker H. Street, Jr. & Co.
Attys.

UNITED STATES PATENT OFFICE.

GEORGE W. McGILL, OF NEW YORK, N. Y.

IMPROVEMENT IN COMBINED ERASIVE TIP AND PENCIL-POINT PROTECTOR.

Specification forming part of Letters Patent No. 188,653, dated March 20, 1877; application filed May 24, 1875.

To all whom it may concern:

Be it known that I, GEORGE W. McGILL, of the city, county, and State of New York, have invented a new and useful Erasive Tip and Point Protector for Pencils; and I do hereby declare the following to be a full, clear, and exact description thereof, reference being had to the accompanying drawings, and to the letters of reference marked thereon, which form a part of this specification, in which—

Figure 1 is a view of my invention applied to a pencil, in position to be used for erasive purposes. Fig. 2 is a sectional view of the device in use as a pencil-point protector. Fig. 3 represents the rubber tip, having the spiral thread projecting from its cylindrical surface, instead of a groove sunk therein. Fig. 4 is a view of the tube, having its spiral groove projecting so as to receive the rubber tip when threaded, as shown in Fig. 3.

My invention has for its object to provide a cheap, simple, and efficient means for holding a rubber eraser, and attaching the same to a lead pencil in such manner that it may be used upon the head of the pencil for erasing purposes, or removed therefrom and placed upon the point to protect the same when not in use, and also to admit the rubber eraser being screwed up out of the tube as its projecting end is worn off, and held firmly therein at any point of its length, until entirely worn off; and it consists of a metallic cylindrical tubular holder, having a single or double spiral groove rolled in one end for the adjustment of a cylindrical piece of erasive rubber, having a corresponding groove upon its exterior surface, and the opposite end of the tubular holder being provided with a vertical slit on two sides, strengthened by an annular groove above the same, all as will be hereinafter more fully described, and pointed out in the claim.

Referring to the drawings, A represents the tubular holder, having a single or double spiral groove, $a$, rolled in its upper end for the reception of the rubber eraser B, provided with a corresponding groove, $b$, cast in its cylindrical exterior surface, as shown, while the opposite end of said tubular holder is provided with a slot, $d$, on two sides, and strengthened by an annular groove, $a'$.

The rubber tip B is screwed down into the tube A, the spiral groove on both the tip and tube serving to hold said tip firmly in place, preventing it while in use from being pushed too far within the tube, and enabling it to be screwed up out of the tube as it becomes worn away.

The spiral groove $a$ of the tube, and $b$ of the erasive tip, may be sunk therein, as shown in Figs. 1 and 2, or raised from the exterior surface, as shown in Fig. 4. If the groove $a$ be rolled in the tube double, and corresponding grooves be cast upon the rubber tip, it will serve to hold the tip more securely in the tube, and will assist its insertion and withdrawal therefrom.

The lower portion of tube A being split, as shown, and strengthened by the annular groove $a'$, permits of its being readily adjusted upon pencils of varying sizes, and also permits of the pencil-point being held and retained in such a position that the point of the same is kept from contact with the bottom of the rubber tip.

The advantages of my invention will be readily apparent, inasmuch as it combines in its construction and operation a high degree of utility and economy with a ready adaptation to the purpose intended.

Having thus described my invention, I claim as new and useful—

The metallic tube A, split at its lower end $d$, and provided with the screw-thread $a$ and annular groove $a'$, in combination with the erasive tip B, having a spiral thread or groove, $b$, formed in or upon its exterior surface, substantially as and for the purpose specified.

GEORGE W. McGILL.

Witnesses:
JOHN W. McGILL,
M. L. McGILL.